Patented Sept. 17, 1940

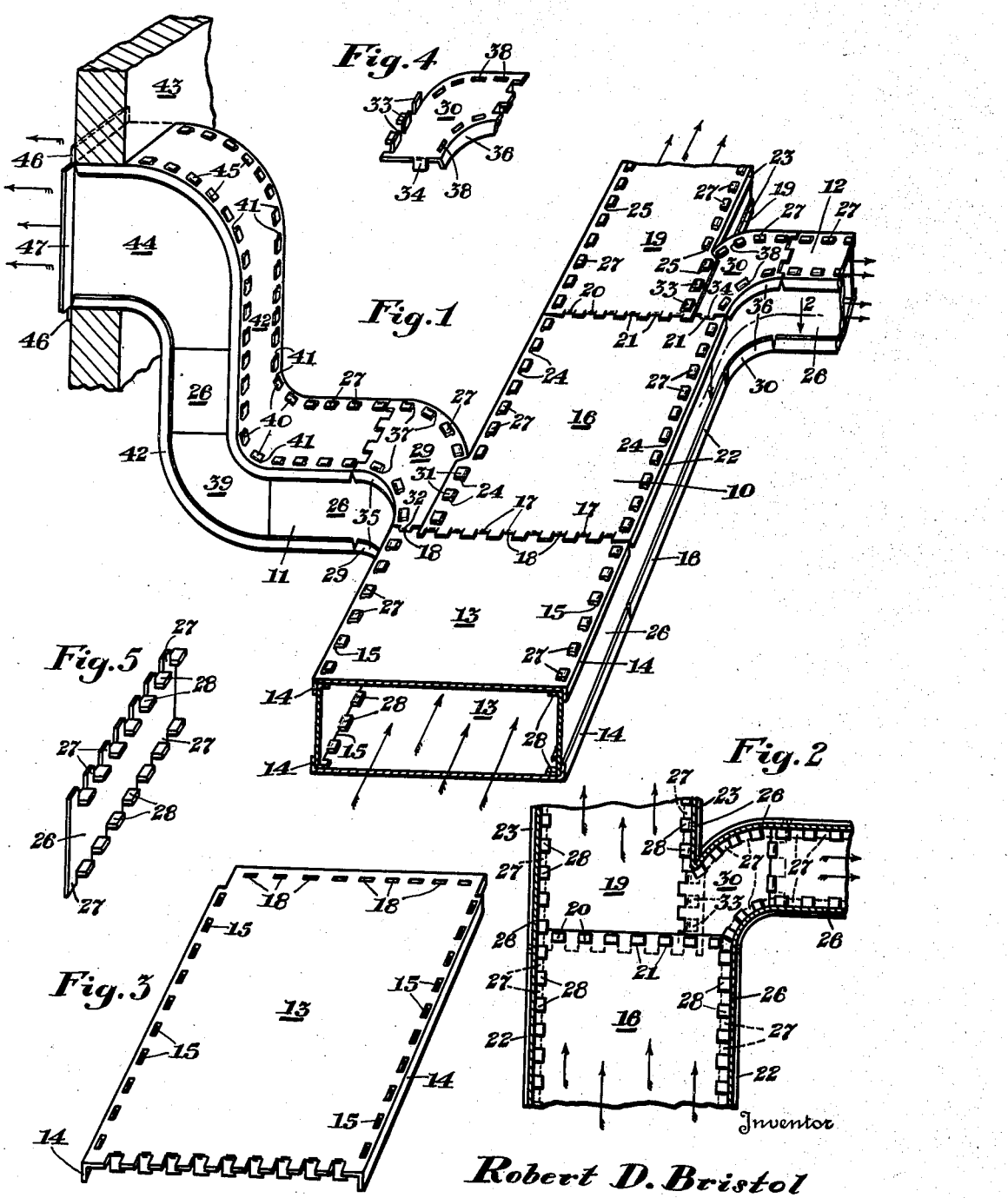

2,215,318

UNITED STATES PATENT OFFICE 2,215,318

AIR DUCT

Robert D. Bristol, Flint, Mich.

Application April 6, 1939, Serial No. 266,261

4 Claims. (Cl. 138—75)

The present invention relates to air ducts, and more particularly to sheet metal air ducts for use in air conditioning systems, heating systems and the like.

The primary objects of the instant invention are to provide an air duct construction comprising standardized elements which may be economically manufactured, conveniently packed for shipment, readily assembled and easily installed; to provide such an air duct construction the standardized elements of which may be assembled at the place of installation to met virtually any of the innumerable conditions which are encountered in such installations; and, to provide such an air duct construction the elements of which may be assembled with a minimum of cutting and fitting of the several sheet metal parts.

An illustrative embodiment of the invention is shown in the accompanying drawing, wherein:

Figure 1 is a perspective view of a fragment of air duct work for supplying air from a central heating or conditioning plant to various parts of a building and in varying quantities;

Figure 2 is a fragmentary sectional view thereof on line 2—2 of Figure 1;

Figure 3 is a perspective view of a sheet metal plate as it appears before assembly into duct work;

Figure 4 is a perspective view of another sheet metal plate as it appears before assembly into branch duct work; and Figure 5 is a perspective view of a fragment of side wall as it appears before assembly into duct work.

It is customary in air duct installations to provide a main duct leading from the central conditioning plant, and branch ducts leading from suitable places in the main duct to the various rooms. The branch ducts are necessarily of smaller diameter than the main duct, and the main duct is diminished in width beyond each branch duct in conformity with the amount of air supplied to that branch.

The duct work in common use today comprises factory made sections of rectangular cross-section, supplied in various widths but of uniform depth, in the installation of which duct work much time and labor are consumed in cutting, fitting and securing special pieces at the points where branch ducts are connected and the main duct is reduced in width. Furthermore, relatively expensive cleats are required to secure the sections together, and the sections are bulky and cumbersome to pack and ship. The invention of the present construction is designed to surmount these difficulties.

Referring to the drawing wherein like parts of the structure shown are designated by the same numerals in the several views, the fragment of air duct work shown in Figure 1 comprises a main duct generally designated 10, and branch ducts generally designated 11 and 12 leading right angularly from the main duct 10 to the left and right respectively thereof, the direction of air currents through the several ducts being indicated by arrows.

That portion of the main duct forwardly of the branch duct 11 comprises a pair of oppositely disposed and spaced parallel plates 13, each plate 13 having marginal side flanges 14 extending laterally toward the corresponding side flanges of the other plate, and each plate 13 being provided with a plurality of equidistantly spaced longitudinal slots 15 adjacent its side flanges 14.

That portion of the main duct 10 between the branch ducts 11 and 12 comprises a similar though narrower pair of spaced plates 16 in endwise overlapping engagement with the plates 13 respectively and secured to said plates 13 by means of tongues 17 on the plates 16, which tongues extend through slots 18 in the plates 13 and are bent over to secure the pairs of plates 13, 16. Similarly, that portion of the main duct beyond the branch duct 12 comprises a pair of spaced plates 19 narrower than the plates 16 and secured in endwise overlapping engagement with the plates 16 by means of tongues 20 on the plates 19 locked in slots 21 on the plates 16. Plates 16 and 19 are provided with marginal side flanges 22, 23 respectively and slots 24, 25 respectively, similar to the flanges 14 and slots 15 of plates 13.

Side walls 26 are provided with equidistantly spaced tongues 27 extending through slots 15, 24, 25 of plates 13, 16 and 19 respectively, said tongues being bent over to secure these plates and the side walls together in rigid assembly. Laterally extending flanges 28 between the tongues 27 of the side walls 26 abut the inner surfaces of the plates.

The elbows connecting branch ducts 11 and 12 with the main duct 10 comprise pairs of oppositely disposed spaced plates 29, 30 respectively. The plates 29 are each provided with tongues 31 which are locked in slots 24 of a plate 16, and with a tongue 32 locked in a slot 18 of a plate 13. Similarly plates 30 are each provided with tongues 33 locked in slots 25 of a plate 19 and with a tongue 34 locked in a slot 21 of a plate 16.

Elbow plates 29 and 30 are provided with flanges 35, 36 respectively and slots 37, 38 respectively adjacent said flanges. Slots 37, 38 receive tongues 27 of the side walls 26, the tongues being bent over to secure these plates and the side walls in rigid assembly. It will thus be seen that the side walls 26 being of flexible sheet metal, may be bent so that an integral piece thereof may form a side wall for the main duct, an elbow, and a branch duct thus eliminating side wall joints at the elbows.

The horizontal and vertical portions of the branch ducts, although narrower than the main duct, are identical in construction to the main duct. In instances where the air duct is turned from a horizontal to a vertical course, corner side wall pieces 39 are used, said pieces having tongues 40 locked in the slots 41 of plates 42. In such instances the plates 42, being of flexible sheet metal, may be bent so that an integral plate extends around the bend in the duct thus eliminating joints in the plates where the bend occurs.

As shown in Figure 1, the upper ends of plates 42 are bent to extend horizontally through a wall 43. Side walls 44 are employed whose tongues 45 are locked in slots 41 of the plates 42. Thus an outlet is formed for the air duct. The ends of plates 42 and side walls 44 may be provided with flanges 46, 47 respectively, these flanges being flush with an inner surface of the wall 43. Plaster may be applied over the flanges 46, 47.

While the air duct work herein shown and described is as air tight as necessary for all practical purposes, the tongue and slot connections may, if desired, be sealed with putty, paint or the like.

It will thus be seen that the air duct work of the present invention comprises elements which are economical in manufacture, convenient in assembly, and readily adaptable for packing and shipping with a minimum of waste space.

While but one specific embodiment of the invention has been herein shown and described, it will be understood that certain details of the construction shown may be altered or omitted without departing from the spirit of this invention as the same is defined by the following claims.

I claim:

1. An air duct comprising oppositely disposed spaced parallel plates each provided with marginal side flanges extending laterally toward the corresponding flanges of the other plate, said plates having a plurality of spaced longitudinally extending tongue-receiving slots adjacent each side flange thereof, and side walls each having its opposite marginal lengths provided with spaced tongues extending through the slots in the plates respectively at one side thereof, said tongues being bent over to secure the plates and side walls together in rigid assembly.

2. An air duct comprising oppositely disposed spaced parallel plates each provided with marginal side flanges extending laterally toward the corresponding flanges of the other plate, said plates having a plurality of spaced longitudinally extending tongue-receiving slots adjacent each side flange thereof, and side walls each having its opposite marginal lengths provided with spaced tongues extending through the slots in the plates respectively at one side thereof and provided with inwardly extending flanges abutting the inner surfaces of the plates, said tongues being bent over adjacent the outer surfaces of the plates.

3. An air duct comprising a pair of spaced parallel plates, a second pair of spaced parallel plates in end to end overlapping engagement with the first pair and connected therewith by means of tongues on some of said plates extending through slots on their overlapping engaging plates, each of said plates being provided with a plurality of spaced longitudinally extending tongue-receiving slots adjacent each marginal side length thereof, and integral side walls for said pairs of plates each having its opposite marginal lengths provided with spaced tongues extending through the slots in the plates respectively at one side thereof, said tongues being bent over to secure the plates and side walls together in rigid assembly.

4. An air duct comprising a substantially horizontal main duct having relatively wide and narrow sections in end to end engagement, each section comprising spaced parallel plates and connecting side walls, the adjacent side walls of said sections at one side thereof being in integral alignment to provide a branch opening at the opposite side thereof, a branch duct communicating with said branch opening and leading angularly substantially horizontally away from said main duct and comprising spaced parallel elbow plates and connecting side walls, the adjacent side walls of said main and branch ducts being integrally formed of bent sheet metal and being provided with spaced longitudinally extending marginal tongues inserted through longitudinal marginal slots in the adjacent plates and bent over to secure the plates and side walls together in rigid assembly.

ROBERT D. BRISTOL.